United States Patent
Noma et al.

(10) Patent No.: US 7,233,135 B2
(45) Date of Patent: Jun. 19, 2007

(54) RIPPLE CONVERTER

(75) Inventors: Takashi Noma, Moriyama (JP); Hiroshi Takemura, Muko (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 303 days.

(21) Appl. No.: 10/913,354

(22) Filed: Aug. 9, 2004

(65) Prior Publication Data

US 2005/0067363 A1    Mar. 31, 2005

(30) Foreign Application Priority Data

Sep. 29, 2003   (JP) ............................. 2003-338069

(51) Int. Cl.
*G05F 1/565* (2006.01)
*G05F 1/56* (2006.01)

(52) U.S. Cl. ....................................... 323/285; 323/284

(58) Field of Classification Search ................ 323/282, 323/284, 285, 286, 351
See application file for complete search history.

(56) References Cited

U.S. PATENT DOCUMENTS

| | | | |
|---|---|---|---|
| 5,982,160 A * | 11/1999 | Walters et al. .............. | 323/282 |
| 6,229,292 B1 * | 5/2001 | Redl et al. .................. | 323/285 |
| 6,369,558 B2 * | 4/2002 | Umemoto .................... | 323/282 |
| 6,421,257 B2 * | 7/2002 | MacKay et al. .............. | 363/41 |
| 6,469,481 B1 * | 10/2002 | Tateishi ...................... | 323/282 |
| 6,642,696 B2 * | 11/2003 | Tateishi ...................... | 323/222 |
| 6,894,471 B2 * | 5/2005 | Corva et al. ................. | 323/282 |

OTHER PUBLICATIONS

"Transistor Gijutsu Special No. 28"; Saishin Dengenkairo Sekkeigijutsu no Subete, CQ Publishing Co., Ltd.; Jul. 1, 1991; pp. 46-47 and 176.
Official communication issued in the corresponding Chinese Application No. 200410079863.9, mailed on Jan. 12, 2007.

* cited by examiner

*Primary Examiner*—Gary L Laxton
(74) *Attorney, Agent, or Firm*—Keating & Bennett, LLP

(57) ABSTRACT

A ripple converter includes a transistor for switching an input direct-current voltage, a choke coil and a smoothing capacitor for smoothing the switched direct-current voltage, a flywheel diode for causing a current to flow through the choke coil when the transistor is turned off, and a comparing unit for controlling the ON/OFF of the transistor according to ripple in an output voltage. In the ripple converter, a waveform converter is provided on a connecting path between an output terminal and a non-inverting input terminal of a comparator in the comparing unit. A result of converting the waveform of the output voltage is compared with a reference voltage, and a result of the comparison is fed back to the transistor.

3 Claims, 16 Drawing Sheets

RIPPLE CONVERTER

BACKGROUND OF THE INVENTION

1. Field of the Invention

The present invention relates to ripple converters. More specifically, the present invention relates to a ripple converter that maintains stable oscillation for switching regardless of the type or capacitance of an externally attached capacitor for smoothing output.

2. Description of the Related Art

A ripple converter generally refers to a DC-DC converter including a switching element for switching an input DC voltage, a choke coil and a smoothing capacitor for smoothing the switched DC voltage, a flywheel diode for causing a current to flow through the choke coil when the switching element is turned off, and a control circuit for controlling the ON/OFF of the switching element according to the magnitude of ripple in an output voltage. Circuits of such a ripple converter are publicly known, as described, for example, in the document, "Transistor Gijutsu Special No. 28, " Tokushuu, Saishin Dengenkairo Sekkeigijutsu no Subete, CQ Publishing Co., Ltd., issued on Jul. 1, 1991.

FIG. 14A shows a circuit diagram of a ripple converter that is similar to the circuits disclosed in the document mentioned above. FIG. 14B shows the voltage at an output terminal of a switching element and the waveform of an output voltage (voltage waveform at an output terminal Vout).

A ripple converter 1 according to the circuit diagram shown in FIG. 14A includes a PNP transistor Q1 that functions as a switching element, a flywheel diode D1, a choke coil L1, a smoothing capacitor C1, and a comparing unit 2. The emitter of the transistor Q1 is connected to an input terminal Vin, and the collector thereof is connected to an output terminal Vout via the choke coil L1. The collector of the transistor Q1 is connected to the ground via the flywheel diode D1. The output terminal Vout is connected to the ground via the smoothing capacitor C1. The comparing unit 2 includes a comparator 3 and a reference voltage source Vref having one end connected to the ground. The non-inverting input terminal of the comparator 3 is connected to the output terminal Vout, and the inverting input terminal thereof is connected to the reference voltage source Vref. The output of the comparator 3 is connected to the base of the transistor Q1. Of these elements, the comparing unit 2 functions as a control circuit for performing feedback control of the ON/OFF of the switching element according to ripple in an output voltage.

In the ripple converter 1 constructed as described above, the voltage (output voltage) vo at the output terminal Vout increases when the output of the comparator 3 is at low level (hereinafter abbreviated as L) and the transistor Q1 is ON. When the output voltage vo exceeds a voltage (reference voltage) vref of the reference voltage source Vref, the output of the comparator 3 changes to a high level (hereinafter abbreviated as H) and the transistor Q1 is turned off. Between when the output voltage vo exceeds the reference voltage vref and when the transistor Q1 is turned off, a delay time t1 such as a delay caused by the comparator 3 and a delay due to a switching time of the transistor Q1 exists. Thus, the output voltage vo keeps increasing during the delay time t1.

The output voltage vo starts decreasing when the transistor Q1 is turned off. When the output voltage vo drops below the reference voltage vref, the output of the comparator 3 changes to L and the transistor Q1 is turned on. Between when the output voltage vo drops below the reference voltage vref and when the transistor Q1 is turned on, a delay time such as a delay caused by the comparator 3 and a delay due to a switching time of the transistor Q1 exists. Thus, the output voltage vo keeps decreasing during the delay time t2. When the delay time t2 elapses and the transistor Q1 is turned on the status returns to initial status. This is continuously repeated. It is described that, as a result, the output voltage vo substantially forms a triangular wave and the average value thereof is maintained substantially at the reference voltage vref.

The document mentioned earlier describes that the voltage at the output terminal Vout forms a substantially triangular wave as described above. However, the description is not necessarily accurate. Presumably, it is assumed that a capacitor having a large equivalent series resistance (ESR), such as an aluminum electrolytic capacitor, is used as the smoothing capacitor C1. Actually, in some cases, the voltage forms a substantially triangular wave as described above depending on the characteristics of the smoothing capacitor C1. However, in other cases, the voltage forms a waveform having sudden voltage changes in the vicinities of the peaks of a triangular wave (the timing of the ON/OFF switching of the switching element), or a waveform obtained by alternately folding back quadratic curves, as will be described later.

More specifically, for example, when a capacitor having a relatively large equivalent series inductance (ESL), such as a leaded low-impedance electrolytic capacitor, is used as a smoothing capacitor, the waveform has sudden voltage changes at the timing of the ON/OFF switching of the switching element, as shown in FIG. 15.

As another example, a case where the smoothing capacitor is an ideal capacitor and has sufficiently small ESR or ESL will be considered. In this case, the current that flows through the choke coil increases linearly when the switching element is ON, and decreases linearly when the switching element is OFF. That is, the waveform of the current that flows through the choke coil is triangular. When the smoothing capacitor is an ideal capacitor, the voltage across the smoothing capacitor is a value obtained by integrating the capacitor current. Thus, the voltage across the smoothing capacitor (i.e., the voltage waveform at the output terminal) obtained by smoothing the choke coil current having a triangular waveform has a waveform in which two quadratic curves are alternately connected with each other, as shown in FIG. 16. A peak point in this case is located in the vicinity of the middle of an ON period or OFF period of the switching element.

As described above, the waveform of the output voltage of the ripple converter changes depending on response delays (delay times t1 and t2) of the system and characteristics of the smoothing capacitor.

Generally, when a DC-DC converter made as a module is used, an additional capacitor for output (another smoothing capacitor) is often externally attached to an output terminal of the module. At the stage of designing the module, it is difficult to predict the characteristics of the capacitor attached to the module. Therefore, in some cases, the driving frequency cannot be set to a desired value when the ripple converter is used. This problem becomes particularly severe when a ceramic capacitor having a small ESR or ESL is used as the output capacitor. More specifically, as will be understood from a comparison between FIG. 16 and FIG. 14(b), when a ceramic capacitor is used, the time when the output voltage vo crosses the reference voltage vref is delayed, which causes a decrease in the driving frequency. Thus, a large value must be chosen for the inductance of the choke coil L1, and ripple increases. Therefore, it has been difficult to use a ceramic capacitor as an output capacitor.

As for the response delays of the system, the main cause is a delay caused by the comparator. The delay caused by the comparator is affected by the amount of overdriving (i.e., the voltage difference between the input terminals, or the voltage difference between a maximum value v1 of the output voltage vo and the reference voltage vref in FIG. 14B), and the delay tends to be greater as the amount of overdriving decreases. That is, the delay decreases as the output voltage changes more rapidly and the delay increases as the output voltage changes more slowly.

For example, in the ripple converter 1 shown in FIG. 14A, when the capacitance of the output capacitor is increased in order to reduce ripple in the output voltage, the amount of temporal change in the output voltage decreases. Thus, the amount of overdriving at the time when the time t1 has elapsed since the output voltage crossed the reference voltage vref is less than v1. Thus, the actual delay time is larger than t1, which caused the driving frequency to decrease as compared to a case where the capacitance of the output capacitor is not increased. When the driving frequency decreases, ripple in the output voltage increases. Thus, even when the capacitance of the output capacitor is increased, ripple in the output voltage does not decrease substantially. That is, the driving frequency decreases without reducing ripple.

SUMMARY OF THE INVENTION

To overcome the problems described above, preferred embodiments of the present invention provide a ripple converter that maintains stable oscillation regardless of the type or capacitance of an output capacitor that is externally attached when the ripple converter is used.

A ripple converter according to a preferred embodiment of the present invention includes a switching element for switching an input direct-current voltage, a choke coil and a smoothing capacitor for smoothing the switched direct-current voltage, a flywheel diode for causing a current to flow through the choke coil when the switching element is turned off, and a control circuit for performing feedback control as to whether the switching element is on or off according to ripple in an output voltage. The control circuit includes a waveform converter for converting a waveform of a signal that is proportional to the output voltage and outputting a resulting signal, and a comparing unit for comparing the output of the waveform converter with a reference voltage and outputting a result of the comparison.

The waveform converter preferably includes a phase converter for converting a phase of the signal that is proportional to the output voltage and outputting a resulting signal. Furthermore, the phase converter preferably includes a differentiator for differentiating an input signal and outputting a resulting signal or an integrator for integrating an input signal and outputting a resulting signal.

Also, the phase converter preferably includes a current detector for detecting a waveform of the current that flows through the choke coil and outputting the waveform of the current, and a signal processor for processing the signal that is proportional to the output voltage according to an output signal of the current detector. Furthermore, the current detector preferably includes a current detecting resistor arranged in series with the choke coil. Alternatively, the current detector may use a resistive component of the choke coil.

A ripple converter according to preferred embodiments of the present invention maintains stable oscillation regardless of the type or capacitance of an output capacitor that is externally attached when the ripple converter is used.

These and various other features, elements, steps, characteristics and advantages of the present invention will become more apparent from the following detailed description of preferred embodiments thereof with reference to the attached drawings.

DETAILED DESCRIPTION OF PREFERRED EMBODIMENTS

First Preferred Embodiment

Figure 1:
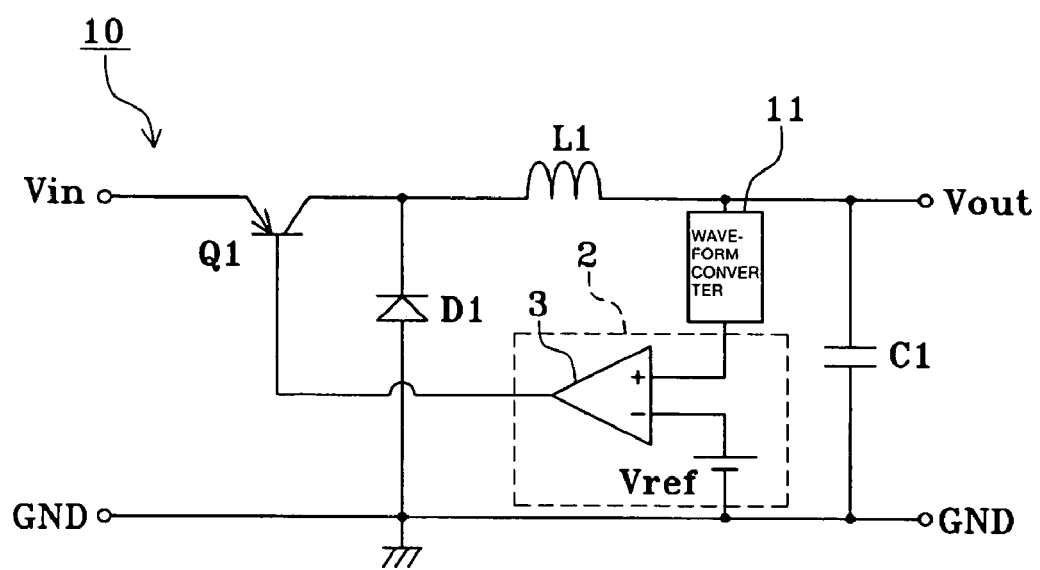
FIG. 1 is a circuit diagram showing a ripple converter according to a preferred embodiment of the present invention.
Figure 14A:
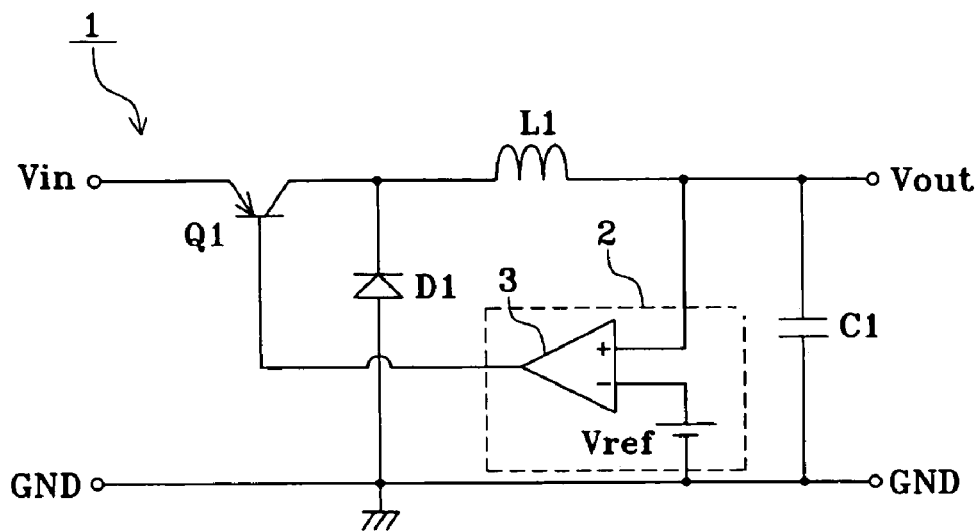
FIG. 14A is a circuit diagram and FIG. 14B is a waveform chart showing voltage waveforms under a certain condition in parts of an example of a ripple converter according to the related art.
Figure 14B:
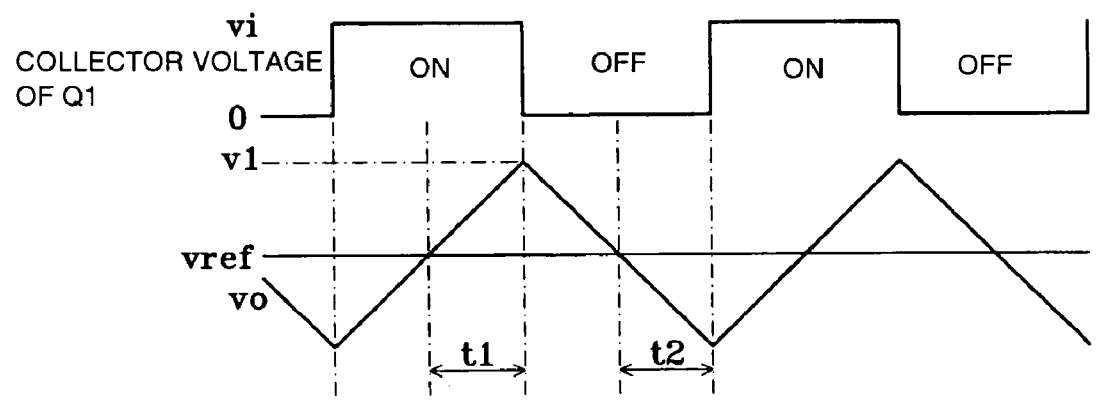
Figure 15:
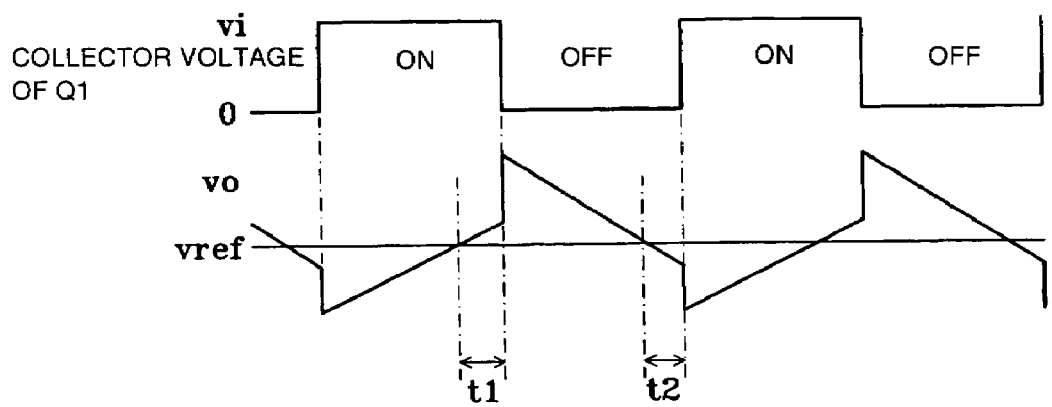
FIG. 15 is a waveform chart showing voltage waveforms under another condition in parts of the ripple converter shown in FIG. 14A.
Figure 16:
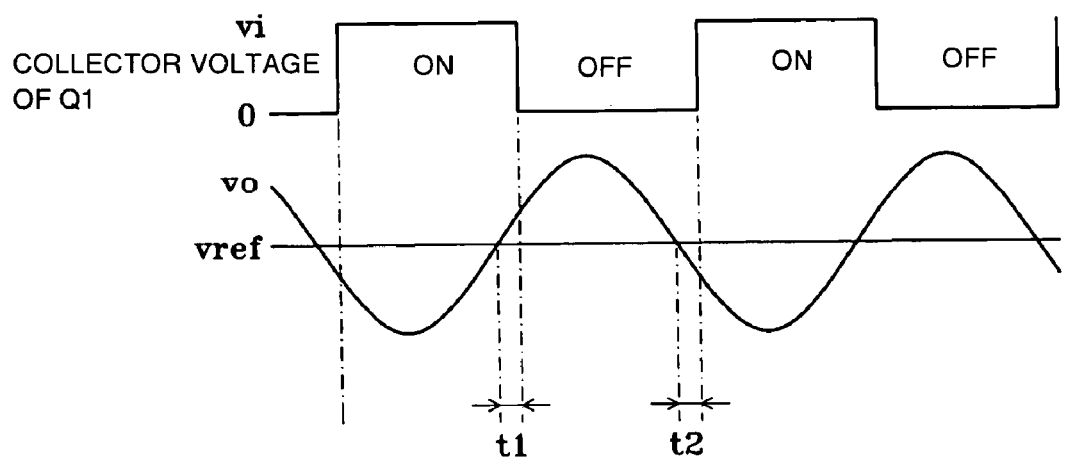
FIG. 16 is a waveform chart showing voltage waveforms under yet another condition in parts of the ripple converter shown in FIG. 14A.

FIG. 1 shows a circuit diagram of a ripple converter according to a preferred embodiment of the present invention. In FIG. 1, elements corresponding or equivalent to those in FIG. 14B are designated by the same numerals, and descriptions thereof will be omitted.

In a ripple converter 10 shown in FIG. 1, a waveform converter 11 is disposed on a connecting path between the output terminal Vout and the non-inverting input terminal of the comparator 3. The ripple converter 10 is otherwise the same as the ripple converter 1 according to the related art shown in FIG. 14. In the ripple converter 10, the waveform converter 11 and the comparing unit 2 define a control circuit for exercising feedback control of the ON/OFF of a switching element according to ripple in an output voltage.

In the ripple converter 10, the waveform of the output voltage vo is converted by the waveform converter 11, and a result of the waveform conversion is compared with the reference voltage vref. As will be described later, the waveform converter 11 converts the waveform of the output voltage vo into a different waveform. Thus, regardless of the output capacitor that is attached to the ripple converter, it is possible to change the characteristics of the waveform converter in accordance with the output capacitor to increase an allowable setting range of the driving frequency, thereby maintaining desired oscillation status. Now, the waveform converter will be described more specifically with reference to preferred embodiments.

Second Preferred Embodiment

Figure 2:
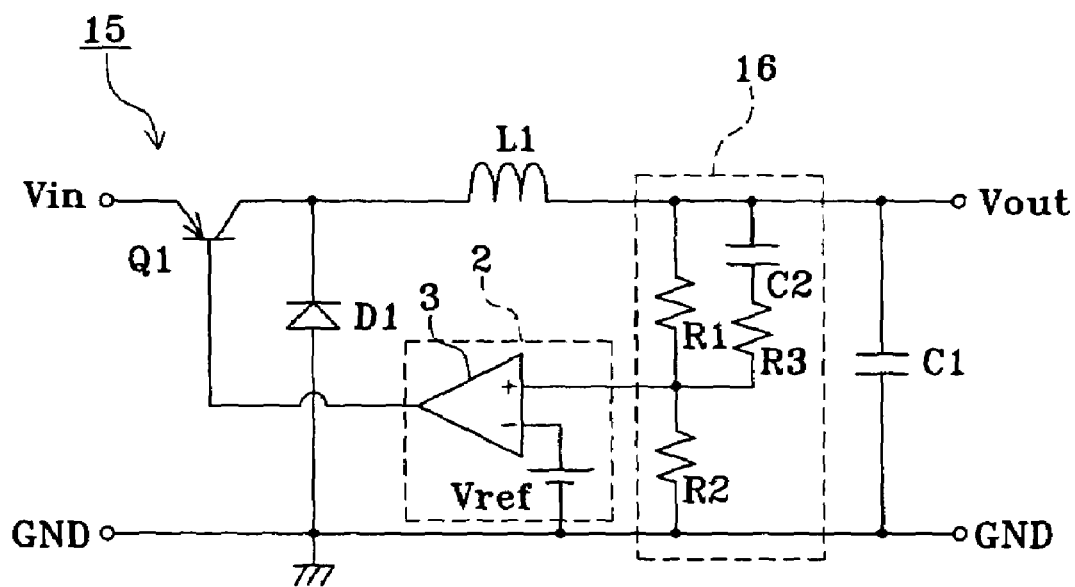
FIG. 2 is a circuit diagram showing a ripple converter according to another preferred embodiment of the present invention.

FIG. 2 shows a circuit diagram of a ripple converter according to another preferred embodiment of the present invention. In FIG. 2, elements corresponding to those in FIG. 1 are designated by the same numerals, and descriptions thereof will be omitted.

In a ripple converter 15 shown in FIG. 2, the output terminal Vout is connected to the ground via resistors R1 and R2 in series. Furthermore, a capacitor C2 and a resistor R3, connected in series with each other, are connected in parallel to the resistor R1. A node between the resistors R1 and R2 is connected to the non-inverting input terminal of the comparator 3. That is, the resistors R1, R2, and R3, and the capacitor C2 define a waveform converter 16.

Of the elements of the waveform converter 16, the resistors R1 and R2 provide a circuit for inputting a voltage ver1 that is proportional to the output voltage vo to the non-inverting input terminal of the comparator 3. The capacitor C2 and the resistors R3 and R2 provide a circuit (differentiator) for inputting a value ver2 obtained by differentiating the output voltage vo from the non-inverting input terminal of the comparator 3. Thus, a voltage ver that is actually input to the non-inverting input terminal of the comparator 3 is a sum of these values. The resistor R3 is provided in order to adjust the amount of feedback of ripple voltage, and may be omitted (short-circuited) when it is unnecessary.

Figure 3:
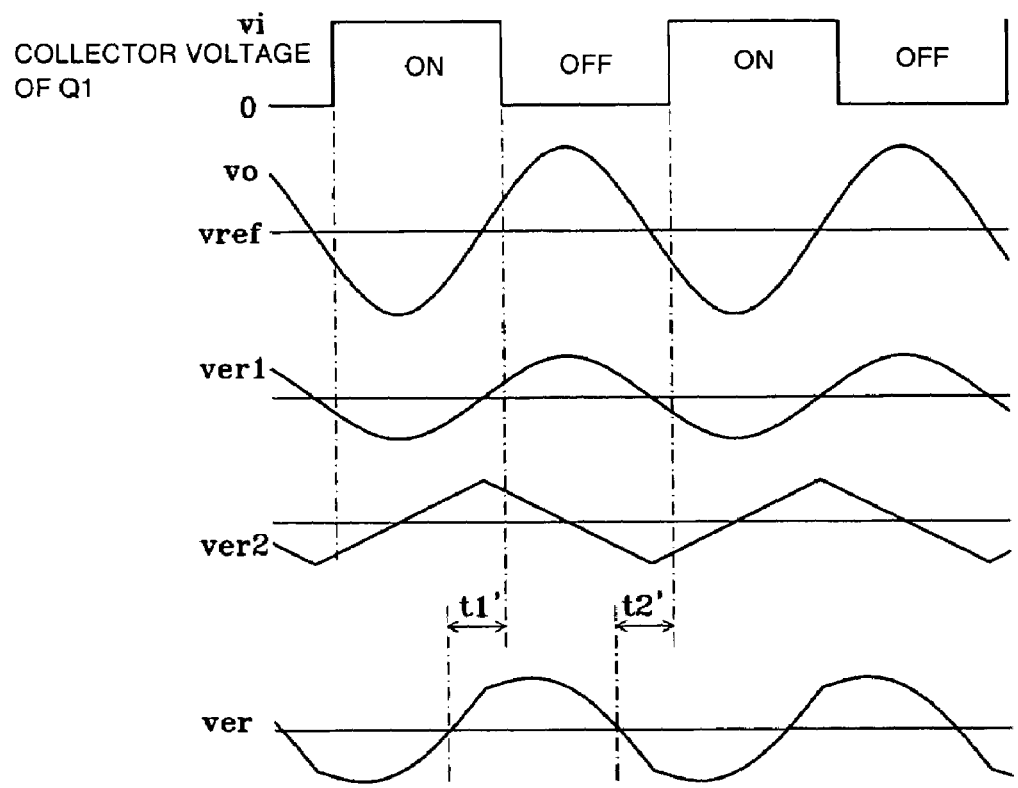
FIG. 3 is a waveform chart showing voltage waveforms under a certain condition in parts of the ripple converter shown in FIG. 2.

Now, it is assumed that a capacitor having a small ESR or ESL, such as a ceramic capacitor, is used as the smoothing capacitor C1. FIG. 3 shows the voltage ver1, the voltage ver2, and the voltage ver in this case. The phase of the voltage ver that is input to the non-inverting input terminal of the comparator 3 is somewhat advanced as compared to the phase of the output voltage vo. Thus, delay times t1' and t2' between when the voltage ver crosses the reference voltage vref and when the ON/OFF of the transistor Q1 is switched are increased as compared to a case where the waveform converter 16 is not used (i.e., when the output voltage vo itself is input to the non-inverting input terminal of the comparator 3).

However, since the delay times are actually constant values determined by the characteristics of the comparator, the ON/OFF of the transistor Q1 is actually switched after predetermined delay times t1 and t2 since the voltage ver crosses the reference voltage vref. The predetermined delay times t1 and t2 are shorter than the delay times t1' and t2' described above. Thus, the ON/OFF of the transistor Q1 switches faster than in the waveform shown in FIG. 3. This indicates that the driving frequency increases. Therefore, a small choke coil is used as the choke coil L1, which enables compact design of the ripple converter 15. Furthermore, the ripple converter 15 overcomes the problem of the related art that, assuming the same delay times (t1, t2), the driving frequency is decreased when a ceramic capacitor is used as the smoothing capacitor C1 as compared to a case where an electrolytic capacitor is used.

Figure 4:
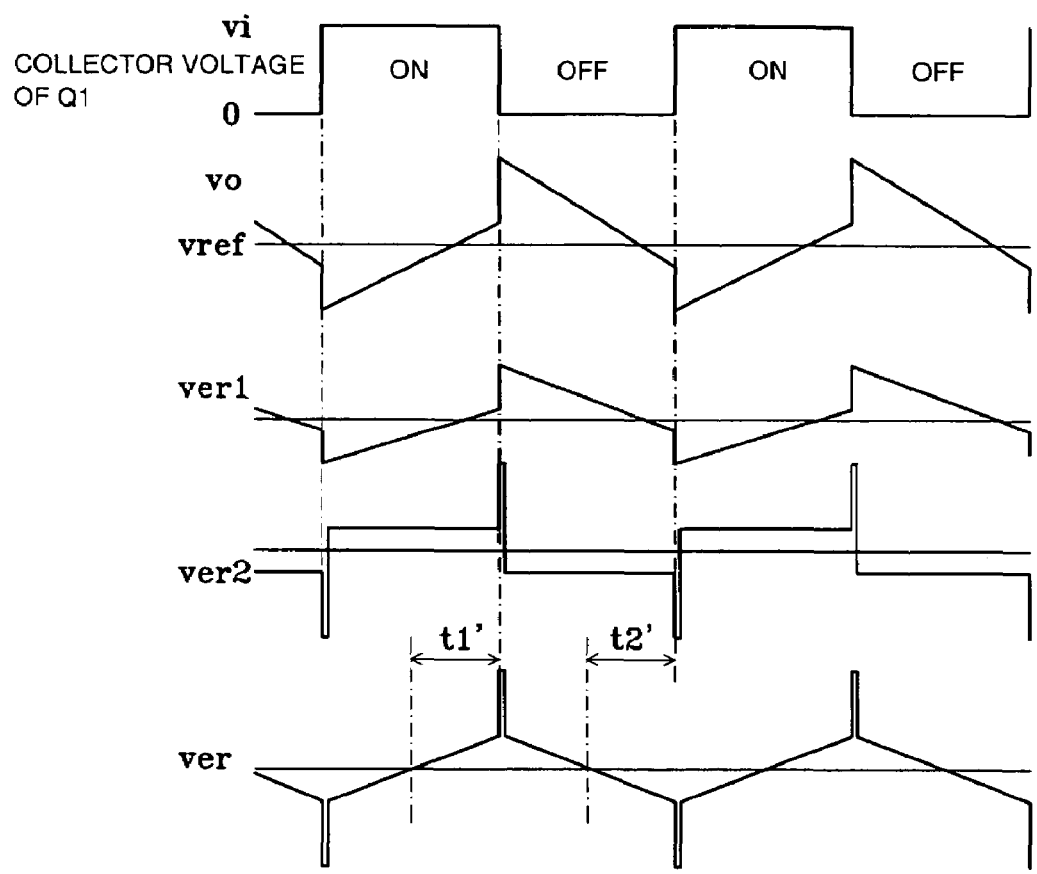
FIG. 4 is a waveform chart showing voltage waveforms under another condition in parts of the ripple converter shown in FIG. 2.

On the contrary, it is assumed that a capacitor having a large ESL, such as a low-impedance electrolytic capacitor, is used as the smoothing capacitor C1. FIG. 4 shows the voltage ver1, the voltage ver2, and the voltage ver in this case. That is, the phase of the voltage ver that is input to the non-inverting input terminal of the comparator 3 is somewhat advanced as compared to the phase of the output voltage vo. Thus, similarly to a case where a capacitor having a small ESR or ESL, such as a ceramic capacitor, is used, the driving frequency is increased. This enables compact design of the ripple converter.

As will be understood from the fact that the phase of the voltage ver that is input to the non-inverting input terminal of the comparator 3 is advanced as compared to the phase of the output voltage vo, the waveform converter 16 essentially includes a phase converter.

Third Preferred Embodiment

Figure 5:
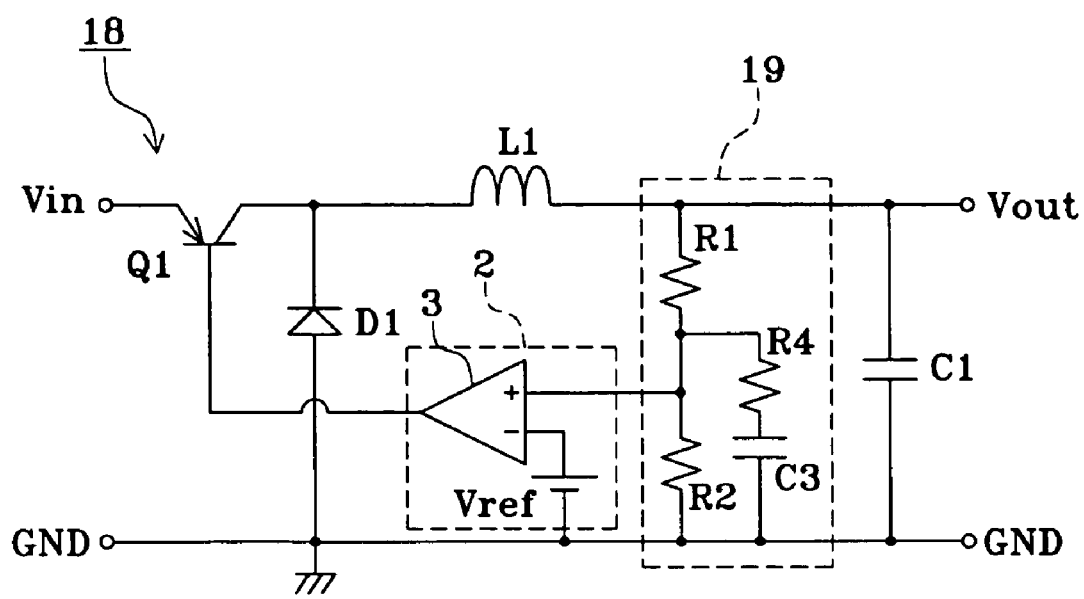
FIG. 5 is a circuit diagram showing a ripple converter according to yet another preferred embodiment of the present invention.

FIG. 5 shows a circuit diagram of a ripple converter according to yet another preferred embodiment of the present invention. In FIG. 5, elements corresponding to those in FIG. 2 are designated by the same numerals, and descriptions thereof will be omitted.

In a ripple converter 18 shown in FIG. 5, instead of the capacitor C2 and the resistor R3 in FIG. 2, a resistor R4 and a capacitor C3, connected in series with each other, are connected in parallel to the resistor R2. Thus, the resistors R1, R2, and R4, and the capacitor C3 define a waveform converter 19.

Of the elements of the waveform converter 19, the resistors R1 and R2 provide a circuit for inputting a value ver1 that is proportional to the output voltage vo to the non-inverting input terminal of the comparator 3. The resistors R1 and R4 and the capacitor C3 provide a circuit (integrator) for inputting a value ver2 obtained by integrating the output voltage vo to the non-inverting input terminal of the comparator 3. Thus, a voltage ver that is actually input to the non-inverting input terminal of the comparator 3 is a sum of these values.

Figure 6:
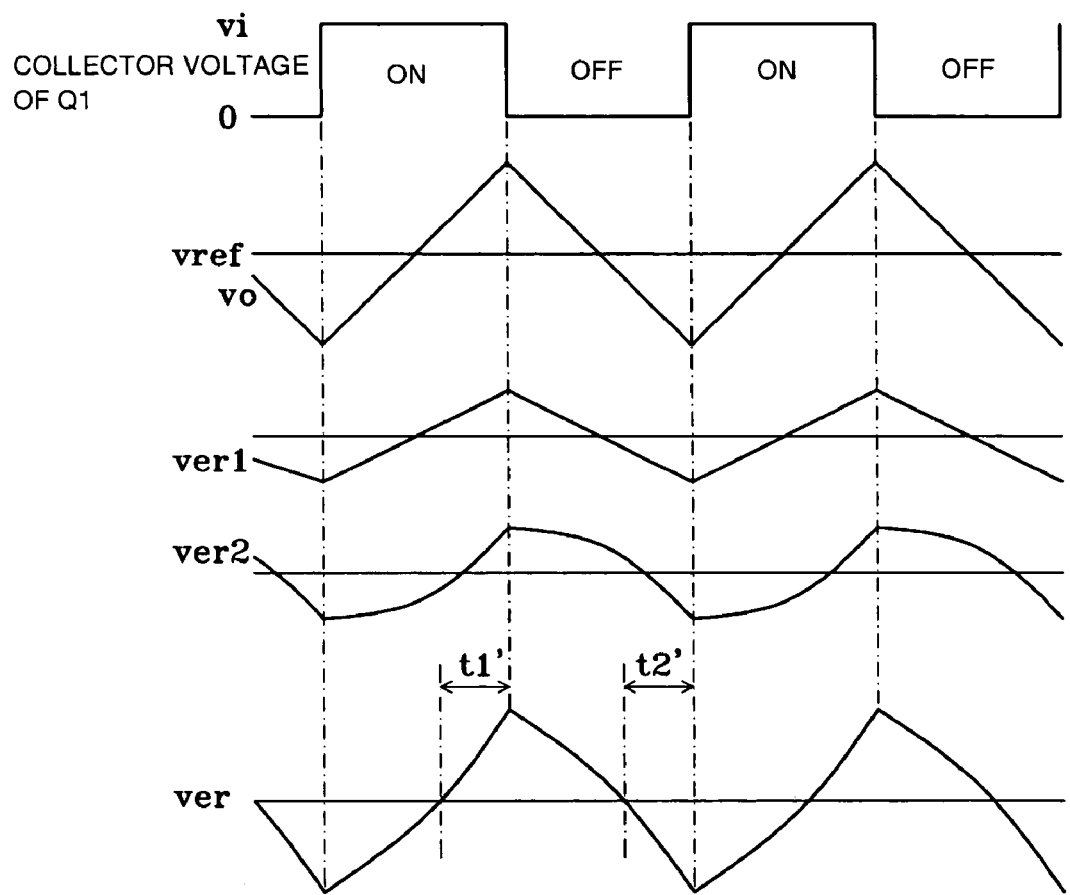
FIG. 6 is a waveform chart showing voltage waveforms in parts of the ripple converter shown in FIG. 5.

Now, it is assumed that a capacitor having a large ESR, such as an ordinary electrolytic capacitor, is used. FIG. 6 shows the voltage ver1, the voltage ver2, and the voltage ver in this case. The phase of the voltage ver that is input to the non-inverting input terminal of the comparator 3 is somewhat delayed as compared to the phase of the output voltage vo. Thus, delay times t1' and t2' between when the voltage ver crosses the reference voltage vref and when the ON/OFF of the transistor Q1 is switched are decreased as compared to a case where the waveform converter 16 is not used (i.e., when substantially the output voltage vo itself is input to the non-inverting input terminal of the comparator 3).

However, since the delay times are actually constant values determined by the characteristics of the comparator, the ON/OFF of the transistor Q1 is actually switched after predetermined delay times t1 and t2 since the voltage ver crosses the reference voltage vref. The predetermined delay times t1 and t2 are longer than the delay times t1' and t2' described above. Thus, the ON/OFF of the transistor Q1 is switched later than in the waveform shown in FIG. 6. This indicates that the driving frequency decreases. When the delay time of a system is small and the driving frequency is high without using a waveform converter, resulting in large switching loss, switching loss is reduced by using an integrated value of an output voltage as such a waveform converter to decrease the driving frequency.

As will be understood from the fact that the phase of the voltage ver that is input to the non-inverting input terminal of the comparator 3 is delayed as compared to the phase of the output voltage vo, the waveform converter 16 essentially includes a phase converter.

Fourth Preferred Embodiment

Figure 7:
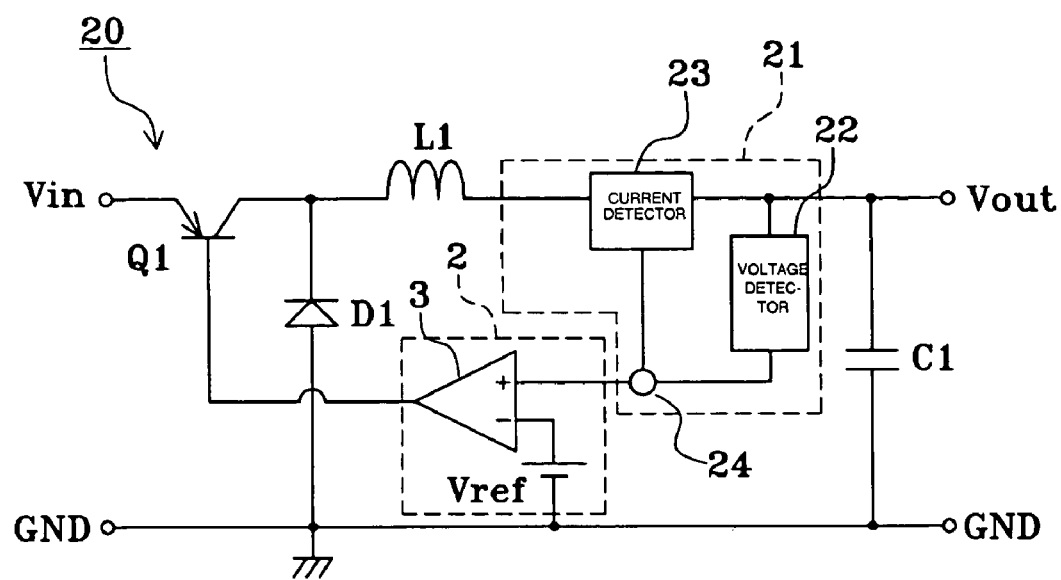
FIG. 7 is a circuit diagram showing a ripple converter according to yet another preferred embodiment of the present invention.

FIG. 7 is a circuit diagram of a ripple converter according to a preferred embodiment of the present invention. In FIG. 7, elements corresponding or equivalent to those in FIG. 1 are designated by the same numerals, and descriptions thereof will be omitted.

A ripple converter 20 shown in FIG. 7 differs from the ripple converter 10 shown in FIG. 1 only with regard to a waveform converter 21. The waveform converter 21 includes a voltage detector 22 for detecting an output voltage vo and outputting a signal that is proportional to the output voltage vo, a current detector 23 for detecting a current that flows through the choke coil L1 and outputting a corresponding signal, and a signal processor 24. The output terminal Vout is connected to an input terminal of the signal processor 24 via the voltage detector 22. The current detector 23 is disposed so as to detect a current that flows through a wire connecting the choke coil L1 with the output terminal Vout, and is connected to another input terminal of the signal processor 24. An output terminal of the signal processor 24 is connected to the non-inverting input terminal of the comparator 3. Now, the current converter and functions thereof will be described specifically.

Fifth Preferred Embodiment

Figure 8:
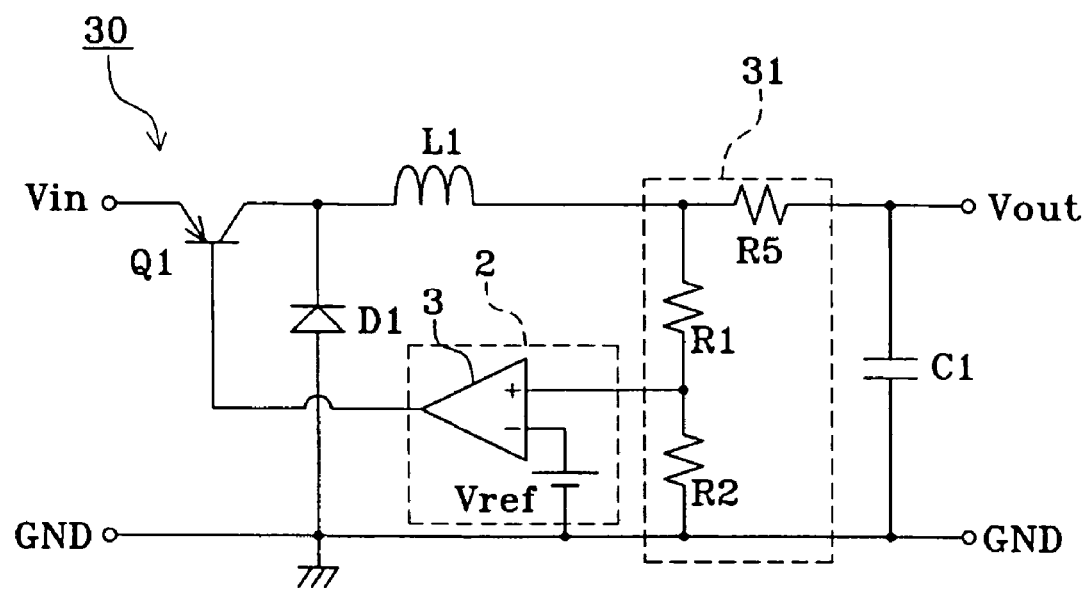
FIG. 8 is a circuit diagram showing a ripple converter according to yet another preferred embodiment of the present invention.

FIG. 8 shows a circuit diagram of a ripple converter according to yet another preferred embodiment of the present invention. In FIG. 8, elements corresponding to those in FIG. 14A are designated by the same numerals, and descriptions thereof will be omitted.

In a ripple converter 30 shown in FIG. 8, a current detecting resistor R5 having a small resistance is disposed between the choke coil L1 and the output terminal Vout, two resistors R1 and R2 are connected in series between the ground and a node between the choke coil L1 and the resistor R5, and a node between the resistors R1 and R2 is connected to the non-inverting input terminal of the comparator 3. In this case, the resistor R1 and R2 and the current detecting resistor R5 define a waveform converter 31, among which the current detecting resistor R5 functions as a current detector.

In the ripple converter 30 constructed as described above, the voltage across the current detecting resistor R5 is proportional to the current that flows through the choke coil L1. Thus, the voltage at the node between the choke coil L1 and the current detecting resistor R5 (denoted as a voltage vr) has a waveform obtained by converting the waveform of the output voltage vo according to the current that flows through the choke coil L1. A voltage obtained by dividing the voltage at the node by the resistors R1 and R2 is input to the non-inverting input terminal of the comparator 3, such that a sum of a signal detected by the current detector and a signal detected by the voltage detector is input to the non-inverting input terminal of the comparator 3. Thus, the waveform converter 31 essentially includes a signal processor for processing a signal that is proportional to the output voltage according to an output signal of the current detector.

Figure 9:
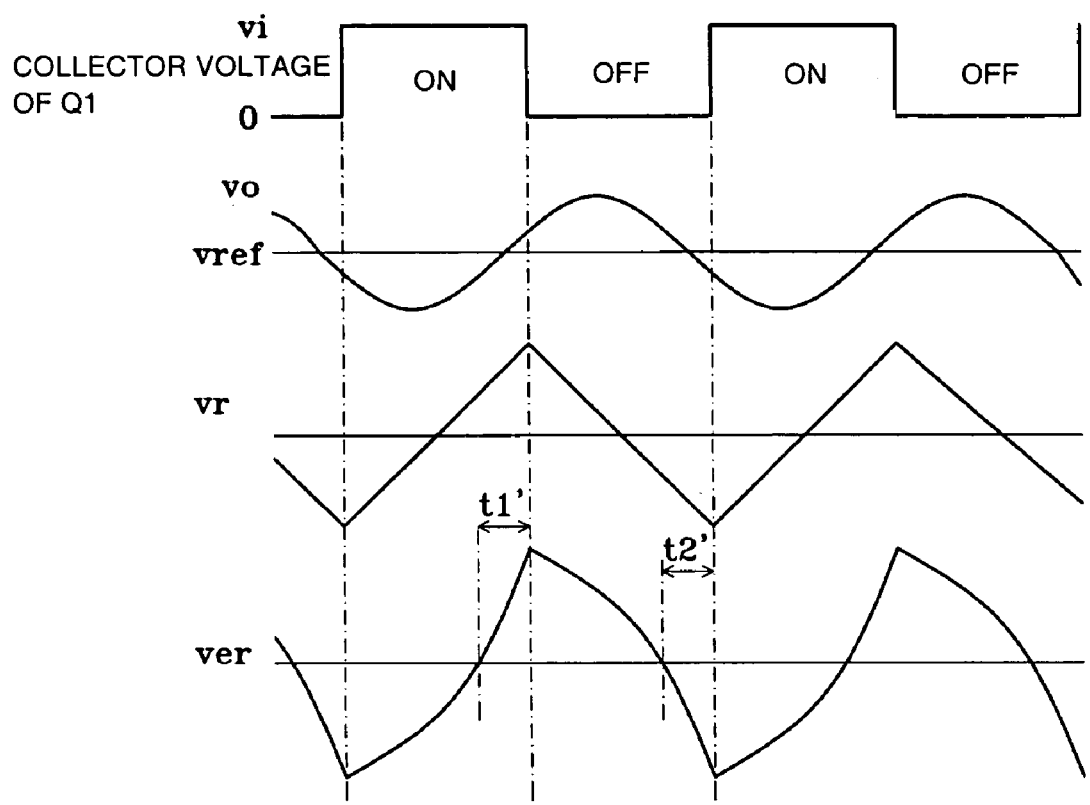
FIG. 9 is a waveform chart showing voltage waveforms in parts of the ripple converter shown in FIG. 8.

Now, it is assumed that a capacitor having a small ESR or ESL, such as a ceramic capacitor, is used as the smoothing capacitor C1 in the ripple converter 30. FIG. 9 shows the voltage vo, the voltage vr, and the voltage ver in this case. The voltage vo is the same as in the case of the ripple converter 15 shown in FIG. 2. The voltage vr has a waveform that increases linearly during an ON period of the transistor Q1 and decreases linearly during an OFF period of the transistor Q1, proportionally to the current that flows through the choke coil L1. The voltage ver is a sum of these voltages.

As will be understood from FIG. 9, delay times t1' and t2' between when the voltage ver crosses the reference voltage vref and when the ON/OFF of the transistor Q1 is switched increase as compared to a case where the waveform converter 31 is not used (i.e., when substantially the output voltage vo itself is input to the non-inverting input terminal of the comparator 3). Thus, the driving frequency increases similarly to the case of the ripple converter 15 shown in FIG. 2.

Furthermore, in the case of the ripple converter 30, the voltages across the resistors R1 and R2 connected in series with each other can be changed by changing the resistance of the current detecting resistor R5, irrespective of the magnitude of ripple voltage. Thus, design flexibility of the waveform converter is increased as compared to the case of the ripple converter 15. Furthermore, stable operation is achieved. In addition, in the ripple converter 30, even when an output capacitor is additionally provided externally to the module, the voltage ver only becomes closer to the voltage vr when the amplitude of the output voltage vo decreases. Thus, advantageously, the driving frequency remains substantially the same.

Sixth Preferred Embodiment

Figure 10:
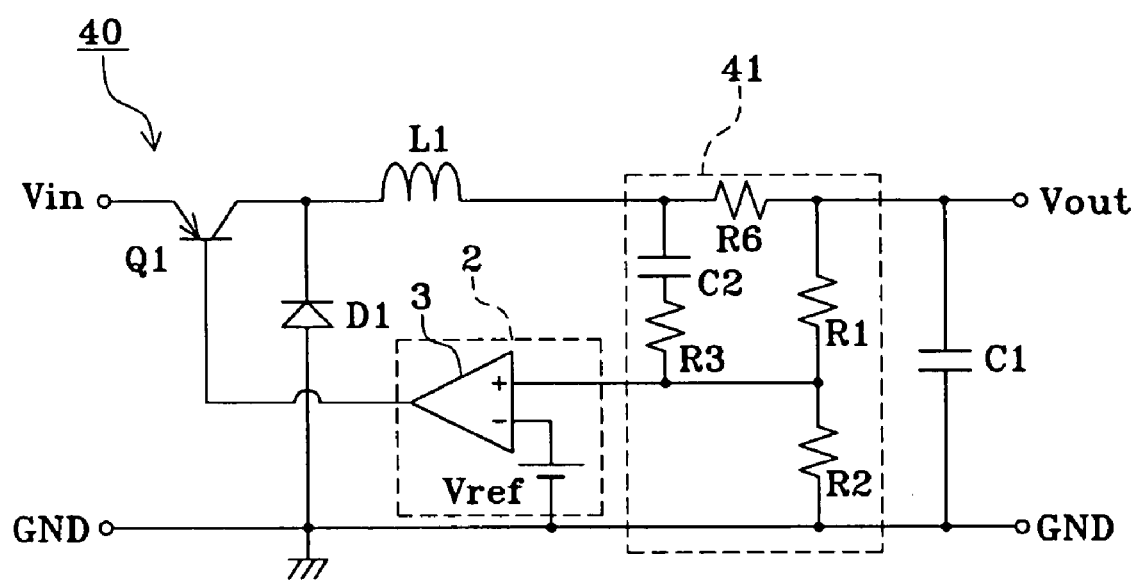
FIG. 10 is a circuit diagram showing a ripple converter according to yet another preferred embodiment of the present invention.

FIG. 10 shows a circuit diagram of a ripple converter according to yet another preferred embodiment of the present invention. In FIG. 10, elements corresponding to those in FIG. 2 are designated by the same numerals, and descriptions thereof will be omitted.

In the ripple converter 15 shown in FIG. 2, the capacitor C2 and the resistor R3, connected in series with each other, are connected in parallel to the resistor R1 in the waveform converter 16. Thus, one end of the capacitor C2 is connected to the output terminal Vout. On the other hand, in a ripple converter 40 shown in FIG. 10, in waveform converter 41, a current detecting resistor R6 is disposed between the choke coil L1 and the output terminal Vout, and one end of the capacitor C2 is connected to a node between the choke coil L1 and the current detecting resistor R6. The resistor R6 has a small resistance and functions as a current detector, similar to the current detecting resistor R5 in the ripple converter 30 shown in FIG. 8. Similar to the case of the ripple converter 15, the resistor R3 may be omitted (short-circuited) when it is unnecessary.

In the ripple converter 40 constructed as described above, the waveform of a signal obtained by the resistors R1 and R2 at a node between the resistors R1 and R2 is proportional to the output voltage vo, similar to the case of the ripple converter 15. On the other hand, the waveform of a signal obtained by the capacitor C2 and the resistors R3 and R2 at a node between the resistors R3 and R2 is a value obtained by differentiating a sum voltage of the output voltage vo and the component of a current that flows through the choke coil L1 in relation to the resistor R6. Thus, the waveform converter 41 essentially includes a signal processor for processing a signal that is proportional to the output voltage according to an output signal of the current detector.

In the ripple converter 30, as opposed to the ripple converter 40, a voltage detected by the resistors R1 and R2 is not the output voltage vo. In this case, the voltage at a node between the choke coil L1 and the resistor R5 is controlled so as to be constant. Thus, the voltage drop across the resistor R5 increases when, for example, the output current increases, which possibly deteriorates load regulation (i.e., the output voltage of the ripple converter changes as the load current is increased).

On the other hand, in the ripple converter 40, the output voltage vo itself is used as a DC feedback by the resistors R1 and R2, such that load regulation is not deteriorated. Furthermore, since AC components of the ripple voltage are input to the comparator 3 via the capacitor C2 and the resistor R3, the waveform at the non-inverting input of the comparator 3 is maintained so as to be substantially triangular, similar to the case of the ripple converter 30. Thus, the accuracy of output voltage is improved while maintaining the advantages of the ripple converter 30.

Furthermore, similar to the ripple converter 30, the magnitude of the voltage that is input to the comparator 3 via the capacitor C2 and the resistor R3 can be changed by changing the resistance of the resistor R6, irrespective of the magnitude of ripple voltage. This increases design flexibility of the waveform converter, and achieves more stable operation.

Seventh Preferred Embodiment

Figure 11:
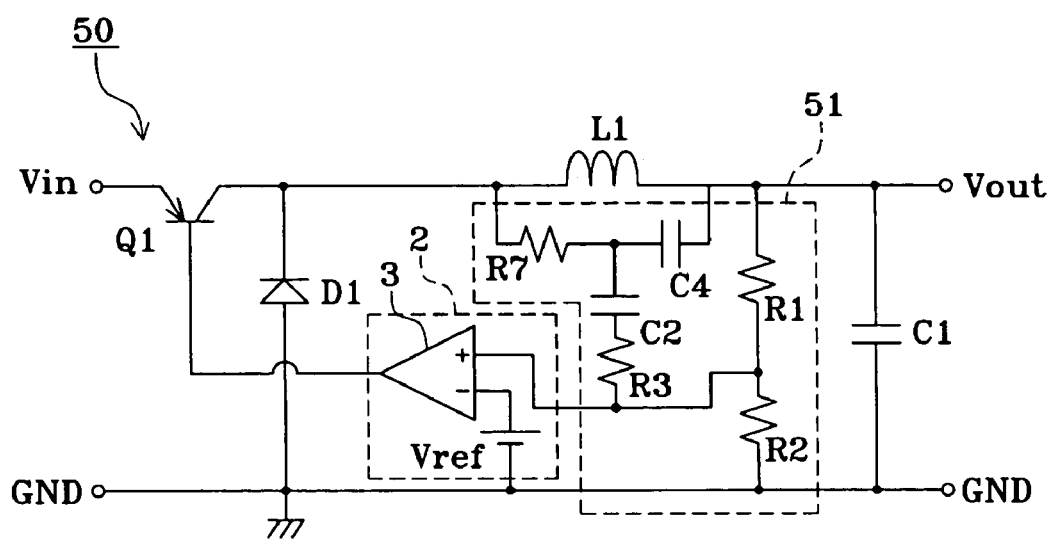
FIG. 11 is a circuit diagram showing a ripple converter according to yet another preferred embodiment of the present invention.

FIG. 11 shows a circuit diagram of a ripple converter according to yet another preferred embodiment of the present invention. In FIG. 11, elements corresponding to those in FIG. 10 are designated by the same numerals, and descriptions thereof will be omitted.

In the ripple converter 40 shown in FIG. 10, the resistor R6 for current detection is disposed in series with a current path between the choke coil L1 and the output terminal Vout in the waveform converter 41. Thus, power loss caused by the current detecting resistor R6 cannot be neglected. In view of this, in a ripple converter 50, a resistive component that the choke coil L1 includes (hereinafter referred to as a resistance Ri) is used such that a discrete resistor such as the resistor R6 disposed in series is omitted.

In the ripple converter 50, a series circuit including a resistor R7 and a capacitor C4 is connected in parallel with the choke coil L1. Furthermore, one end of the capacitor C2 is connected to a node between the resistor R7 and the capacitor C4, defining a waveform converter 51. That is, the waveform converter 51 includes the resistors R1, R2, R3, and R7, and the capacitors C2 and C4.

Now, the relationship among the choke coil L1 (inductance l1 and resistive component ri), the resistor R7 (resistance r7), and the capacitor C4 (capacitance c4) in the ripple converter 50 will be considered. It is generally known that the voltage across the capacitor C4 is proportional to the value of the current that flows through the choke coil L1 when the values are chosen such that $c4=l1/(ri\cdot r7)$. Thus, the voltage at the node between the resistor R7 and the capacitor C4 is substantially the same as the voltage at the node between the choke coil L1 and the current detecting resistor R6 in the ripple converter 40. Thus, the ripple converter 50 achieves the same advantages as the ripple converter 40 while eliminating unnecessary power loss due to the addition of a discrete current detecting resistor.

When the values are chosen such that $c4<l1/(ri\cdot r7)$, the ripple voltage across the capacitor C4 increases. Thus, the overdrive voltage of the comparator 3 increases, such that the driving frequency increases. On the contrary, when the values are chosen such that $c4>l1/(ri\cdot r7)$, the ripple voltage across the capacitor C4 decreases, such that the driving frequency decreases. That is, an effect equivalent to the effect of increasing or decreasing the resistance of the resistor R6 in the ripple converter 40 is achieved.

Eighth Preferred Embodiment

Figure 12:
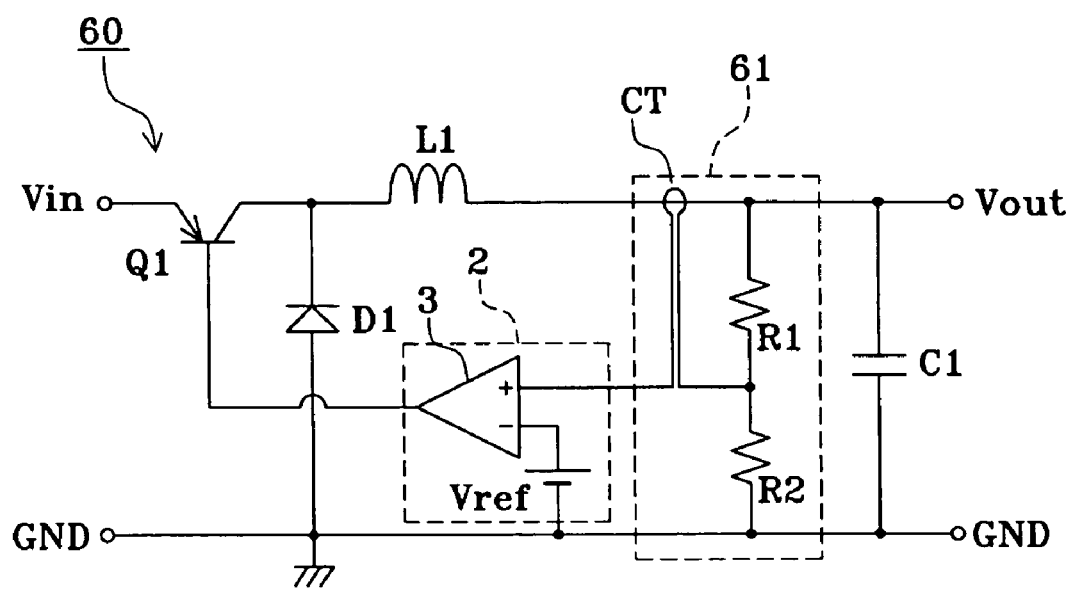
FIG. 12 is a circuit diagram showing a ripple converter according to yet another preferred embodiment of the present invention.

FIG. 12 shows a circuit diagram of a ripple converter according to yet another preferred embodiment of the present invention. In FIG. 12, elements corresponding to those in FIG. 2 are designated by the same numerals, and descriptions thereof will be omitted.

In a ripple converter 60 shown in FIG. 12, as a current detector in a waveform converter 61, a current transformer CT is disposed on a wire connecting the choke coil L1 with the output terminal Vout. One of the terminals of the current transformer CT is connected to a node between the resistors R1 and R2, and the other terminal is connected to the non-inverting input terminal of the comparator 3. By the connections described above, a signal adder, i.e., a signal processor, is provided.

In the ripple converter 60 constructed as described above, a voltage that is proportional to a current that flows through the choke coil L1 is generated on the current transformer CT. Then, the voltage is added to a voltage ver1 that is proportional to the output voltage vo appearing at the node between the two resistors R1 and R2, and the result is input to the non-inverting input terminal of the comparator 3.

As described above, in the ripple converter 60, it is possible to convert the waveform by adding a voltage that is proportional to a current that flows through the choke coil L1 to a voltage that is proportional to the output voltage vo. The current that flows through the choke coil L1 depends on the difference between input and output voltages and the inductance of the choke coil L1, regardless of the type of an output capacitor. Thus, stable control operations are provided regardless of the type or capacitance of an output capacitor.

Also in this case, similar to the case of the ripple converter 50, the output voltage is accurately controlled even when the load current is large.

Figure 13A:
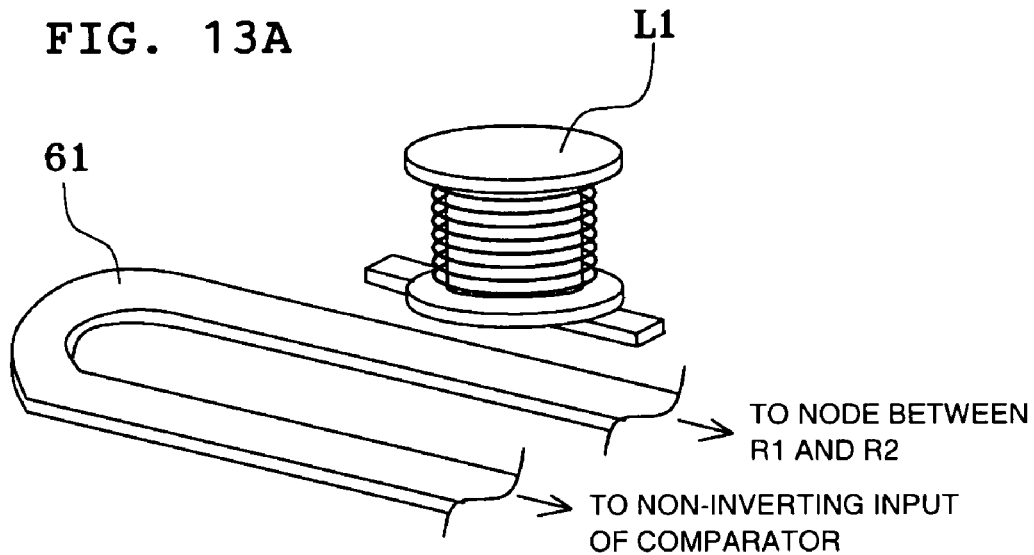
FIG. 13A is a perspective view and FIG. 13B is a sectional view showing an example of a current transformer in the ripple converter shown in FIG. 12.
Figure 13B:
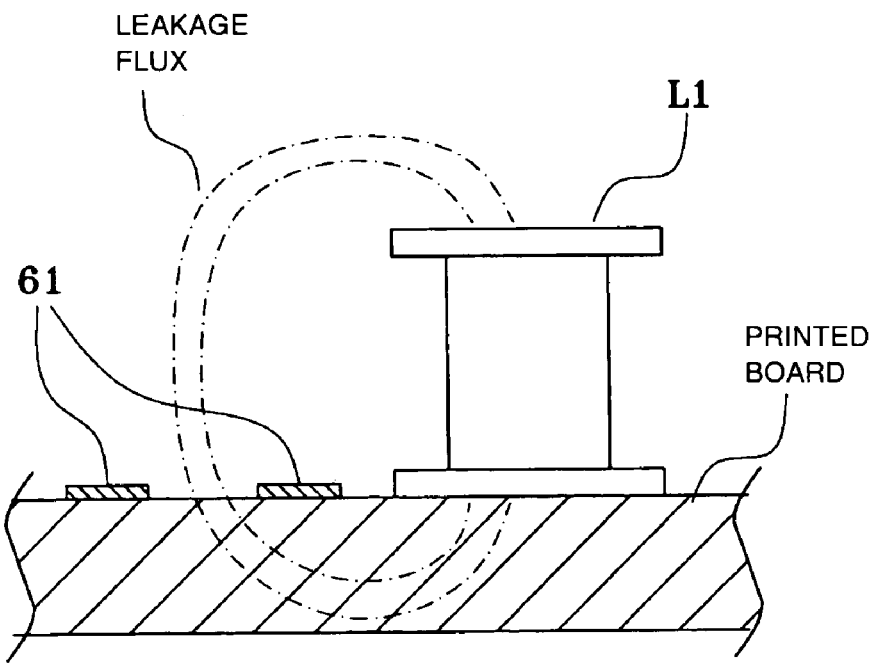

Instead of the current transformer CT, a wiring electrode 61 disposed in proximity to the choke coil L1 may be used, as shown in FIGS. 13A and 13B. FIG. 13A is a perspective view and FIG. 13B is a sectional view showing positional relationship between the choke coil L1 and the wiring electrode 61.

According to the arrangement described above, a flux (leakage flux) generated by a current that flows through the choke coil L1 crosses the wiring electrode 61. Accordingly, although such a large value as in the case where a current transformer is used cannot be expected, a voltage that is proportional to the current that flows through the choke coil L1 is generated on the wiring electrode 61. Thus, advantageously, a current transformer need not be separately provided.

It should be understood that the foregoing description is only illustrative of the present invention. Various alternatives and modifications can be devised by those skilled in the art without departing from the present invention. Accordingly, the present invention is intended to embrace all such alternatives, modifications and variations that fall within the scope of the appended claims.

What is claimed is:

1. A ripple converter comprising:
   a switching element arranged to switch an input direct-current voltage;
   a choke coil and a smoothing capacitor arranged to smooth the switched direct-current voltage;
   a flywheel device arranged to cause a current to flow through the choke coil when the switching element is turned off; and
   a control circuit arranged to perform feedback control as to whether the switching element is on or off according to ripple in an output voltage; wherein
   the control circuit includes a waveform converter arranged to convert a waveform of a signal that is proportional to the output voltage and output a resulting signal, and a comparing unit arranged to compare the output of the waveform converter with a reference voltage and output a result of the comparison;
   said waveform converter includes a plurality of resistors and at least one capacitor;
   the at least one capacitor and at least one of the plurality of resistors of the waveform converter are connected in series, and another of the plurality of resistors is connected in parallel to the at least one capacitor and the at least one of the plurality of resistors; and
   one end of each of the at least one of the plurality of resistors and the another of the plurality of resistors is directly connected to a non-inverting input terminal of the comparing unit.

2. The ripple converter according to claim 1, wherein one of the plurality of resistors defines a current detecting resistor, the current detecting resistor is connected between the choke coil and an output terminal of the ripple converter, and one end of the at least one capacitor is connected to a node between the choke coil and the current detecting resistor.

3. The ripple converter according to claim 1, wherein the at least one capacitor includes first and second capacitors, the first capacitor is connected in series to the at least one of the plurality of resistors, the second capacitor and another of the plurality of resistors are connected in series to one another and in parallel to the choke coil, and one end of the first capacitor is connected to a node between the another of the plurality of resistors and the second capacitor.

* * * * *